Patented Oct. 3, 1944

2,359,346

UNITED STATES PATENT OFFICE 2,359,346

GRANULAR SILICATE COMPOSITIONS

Charles C. Winding, Ithaca, N. Y., assignor to Tide Water Associated Oil Company, Bayonne, N. J., a corporation of Delaware No Drawing. Application June 4, 1943,
Serial No. 489,697

8 Claims. (Cl. 252—272)

The present invention relates to silicate compositions and methods for producing the same. More particularly, the invention concerns improved adsorbent compositions containing silicates produced by base exchange reactions.

In my copending application Serial No. 419,109, filed November 14, 1941, of which the present application is a continuation-in-part, I have disclosed silicate adsorbent compositions of granular form and methods for producing said compositions which comprise treating in the solid state a metal silicate of particular physical properties with an aqueous solution containing ions of a suitable metal to replace the metal of the silicate with the metal of the solution in a base exchange reaction. Obtainment of proper adsorbent structure and other desirable physical properties such as hardness of granules in the "exchange silicate" resulting from the base exchange reaction depends upon, and is determined by, use in the exchange reaction of a metal silicate having certain desired properties and structure. Precipitated silicate materials prepared by certain controlled operations are suitable for use in the exchange reaction to obtain exchange silicate adsorbent compositions having the stated desired properties. In one embodiment, disclosed in my said copending application, a precipitate containing calcium silicate is prepared by reacting in hot solution a suitable sodium silicate with a calcium salt such as calcium chloride which may be associated with other substances such as magnesium chloride in the form of certain natural or artificial brines. The calcium silicate-containing precipitate is washed and then dried sufficiently that it may be ground to desired particle size. The dried material is then preferably ground at this stage to granular particles and screened to a size depending upon the use to which the final exchange product is to be put, and the resulting screened particles are then treated with a hot solution of a magnesium salt which may consist of the aforementioned brines, to convert, by base exchange reaction, the calcium silicate to magnesium silicate. The resulting "exchange" magnesium silicate is in granular form, and when properly dried possesses high adsorbent activity.

One important control factor is the concentrations of the precipitants used in the preparation of the calcium silicate-containing precipitate. If concentrations within certain critical limits are used the precipitate when dried is characterized by a sufficiently hard structure that it may be ground to granular particles of desired size as aforesaid, and when subjected to the exchange reaction is converted to an highly active granular exchange silicate adsorbent. On the other hand, precipitates prepared from precipitants of concentrations outside the critical limits result in precipitates which when dried either are too soft to be ground to granular size and disintegrate to a powder unsuitable for subsequent conversion to hard granular exchange silicates by means of the exchange reaction, or they do not possess the proper physical structure for base exchange conversion to highly active granular adsorbents.

These critical concentration limits vary somewhat depending upon the particular materials used as precipitants. Concentration limits suitable for various precipitants are set forth in detail in my copending application, Serial No. 419,109 mentioned hereinabove, as well as my copending applications Serial No. 389,170, filed April 18, 1941; Serial No. 419,089, filed November 14, 1941; and Serial No. 426,287, filed January 10, 1942. In general it may be stated that by way of suitable overall concentrations where precipitated calcium silicate-containing materials are employed in the base exchange reaction the concentration of the sodium silicate precipitant should be between about 0.08 molar and about 0.4 molar (as to $Na_2O$ content) and the concentration of the calcium chloride containing precipitant should be between about 0.08 molar and about 0.4 molar (on basis of $CaCl_2$ plus $MgCl_2$ present).

The adsorbent compositions described in my said copending applications as well as those constituting the subject of the present invention are particularly adapted for use in percolation decolorizing methods, especially in the percolation decolorization of oils. One important property desired in adsorbents employed in such percolation methods is that of high resistance to attrition or breakdown of the granular particles, as will be further explained below, and the present invention has as its principal object the provision of silicate adsorbents having this property.

In decolorizing oils by percolation treatment a deep static bed of adsorbent material is provided through which the oil filters or percolates. When, by reason of adsorbing coloring matter from the oil, the adsorbent material shows diminished activity, oil flow is cut off. After draining and steaming in situ the adsorbent may be removed by a suitable conveyor system to a furnace, such as the familiar multiple hearth, rabble arm type, and revivified by burning. The adsorbent is then conveyed back to the filtration tanks for re-use. In the course of these handling operations an adsorbent having low resistance to attrition will be rduced to an objectionable degree from its desired particle size to "fines" or dust-like material of no value in the stated use.

The present invention is concerned with improvements in the preparation of active granular silicate adsorbent compositions effective to impart to the same special or desired properties and has particular reference to control of the breakdown characteristics of the product. In general embodiment, the underlying concept of the invention is directed to operating procedure in the production of active base exchange silicates of the type described in my said copending applications which enables the obtainment of optimum or desired degree of resistance to breakdown. This concept, and its useful application to the production of active exchange silicates, arises from the discovery that resistance to breakdown or attrition loss of the exchange silicates is related to the water content of such product and, furthermore, that the particular proportional water content should be relatively low for improved resistance to breakdown.

The present invention may be adapted to the production of exchange silicates by the procedure described in my said copending applications and outlined hereinabove by controlling the drying conditions employed in drying the silicate product resulting from the exchange reaction. I have found that the lower the water content of these exchange silicate products the higher the resistance thereof to breakdown, and that by drying the exchange silicates to relatively low water content certain other desired properties can be obtained in addition to improved breakdown resistance. Thus it is possible, by proper drying, to produce adsorbents having desirable combinations of properties.

In general, the stated exchange silicate adsorbents should be dried to a water content of below about 13 per cent. Increase in water content above this figure is accompanied by decreases both in adsorbent activity and breakdown resistance. On the other hand, decrease in water content to below about 13 per cent results in improvement as respects both of these factors. The adsorbent activity of the product passes through a peak or optimum value while the resistance to breakdown continues to improve, as the water content is decreased. For example, granular exchange magnesium silicate adsorbents exhibit peak or optimum oil decolorizing power in the percolant method of decolorizing lubricating oils when they contain from about 8 to about 12 per cent water.

An important feature of the present invention resides in the provision of exchange silicate adsorbents having in addition to high adsorbent activity, also superior breakdown resistance. This desirable combination of properties is obtained by drying the exchange silicates to water contents which may be even lower than that required for optimum adsorbent activity. Thus in the case of the stated granular exchange magnesium silicate adsorbents it has been found that reduction of water content to below 6 per cent results in material improvement in breakdown resistance properties and results in products of satisfactorily high decolorizing power. Greater lowering of water content as to below about 5 per cent results in products of even higher breakdown resistance. Such products possess adsorbent activity and breakdown resistance considerably higher than any commercially used percolant oil decolorizing adsorbent with which I am aware and constitute admirably effective and satisfactory materials for this purpose.

The present invention provides for increased economy in methods employing granular adsorbents in that use of the adsorbents herein disclosed because of their resistance to attrition loss entails decreased "throw-away" or discard of fines produced in mechanical handling of the adsorbent. Thus, in the percolant method of decolorizing lubricating oils referred to hereinabove less quantities of new adsorbent are needed for replacement purposes during successive periods of use and regeneration.

Illustrating the invention as applied to the stated exchange silicates a magnesium silicate-containing product was produced according to the procedure described in my copending applications by reacting in hot aqueous solution a sodium silicate in 0.2 molar concentration (as to $Na_2O$ content) and a natural brine containing calcium chloride and magnesium chloride in 0.2 molar concentration (as to calcium chloride plus magnesium chloride), filtering and washing the resulting precipitate of calcium silicate material, drying the washed material to a grindable condition, grinding and screening to 30–60 mesh granular particles and treating said particles with a hot brine containing magnesium chloride to effect replacement of the calcium of said calcium silicate with magnesium. The resulting exchange magnesium silicate granular particles were then washed and samples thereof were individually dried to various water contents. Each sample was then separately tested to determine its breakdown resistance.

In the test procedure 100 c. c. of the dried material after being thoroughly screened to 30–60 mesh range of particle size is placed in the eight inch pan of a standard sieve set together with ten ⅝ inch steel balls. A cover is placed on the pan and the covered pan is placed in a "Ro-Tap" sieve shaker. The machine is operated for eight minutes with the tap hammer disconnected. The material is then removed and screened to obtain the weight per cent passing through a 60-mesh sieve. This percentage is taken as the breakdown under the test conditions described.

The relation between breakdown resistance and water content of the particular material prepared as above described is shown in the table hereinbelow, in which the enumerated samples designate the said material. In the table "Breakdown" denotes the percentage of material passing through a 60-mesh screen after the described test. Thus the lower the "Breakdown" designated in the table the higher the resistance of the particular sample to breakdown or attrition loss. Water contents appearing in the table, and as the term is employed throughout this specification and claims, means that portion of the material which volatilizes when the material is heated to substantially constant weight by means of a blast lamp.

| Sample No. | Water content | Breakdown |
|---|---|---|
| | Per cent | Per cent |
| 1 | 2 | 10 |
| 2 | 4 | 12 |
| 3 | 6 | 14 |
| 4 | 8 | 16 |
| 5 | 10 | 18 |
| 6 | 15 | 20 |

Instead of drying the exchange silicate product in a single operation as in the above example, the desired water content may be obtained by drying in two or more stages entailing removal of water in increments. For example, the material from the exchange reaction may be dried to a certain water content in a first drying stage and then further dried prior to use. This procedure has been found to result in products of somewhat higher breakdown resistance than those of the same water content produced by single-stage drying.

Generally any temperature may be employed in these drying operations which is effective to remove the desired amount of water without destroying the physical structure of the product responsible for its adsorbent activity. Ordinarily temperatures of the drying atmosphere ranging from about 250° F. to about 1100° F are satisfactory. Care should be taken, particularly at the higher of these temperatures, to prevent localized overheating. This may be accomplished by use of a rotary kiln dryer or other means for supplying agitation and uniform heating of the product.

I claim:

1. Method for producing a magnesium silicate composition effective as an adsorbent in percolation filtration of lubricating oils which comprises precipitating a calcium silicate material from aqueous solution, drying the precipitate, treating the dried material with an aqueous solution containing magnesium ions to exchange calcium ions of the calcium silicate with magnesium ions and drying the resulting magnesium silicate product to a water content of at least about 2 per cent but below about 13 per cent.

2. Method defined in claim 1 in which the magnesium silicate product is dried to a water content between about 8 per cent and about 12 per cent.

3. Method defined in claim 1 in which the magnesium silicate product is dried in successive stages.

4. Method defined in claim 1 in which the magnesium silicate product is dried to a water content between about 2 per cent and about 6 per cent.

5. Method defined in claim 1 in which the magnesium silicate product is dried in successive stages to a water content of between about 8 per cent and about 12 per cent.

6. A magnesium silicate composition having oil decolorizing activity and specially characterized by physical properties including a hard structure relatively resistanct to attrition, making it suitable for percolation oil filtration, said composition having been prepared by precipitating under controlled conditions a calcium silicate material, drying said material, treating the dried material with an aqueous solution containing magnesium ions to exchange calcium ions of the calcium silicate with magnesium ions, and drying the resulting magnesium silicate product, said magnesium silicate composition having a water content of at least 2 per cent but below about 13 per cent.

7. A magnesium silicate composition as described in claim 6 having a water content between about 8 per cent and about 12 per cent.

8. A magnesium silicate composition as described in claim 6 having a water content of at least about 2 per cent but below about 6 per cent.

CHAS. C. WINDING.